United States Patent
Weems et al.

(10) Patent No.: US 12,275,186 B2
(45) Date of Patent: Apr. 15, 2025

(54) TUNABLE MATERIALS

(71) Applicant: 4D MEDICINE LIMITED, Birmingham (GB)

(72) Inventors: Andrew Weems, Edgbaston (GB); Andrew Dove, Edgbaston (GB)

(73) Assignee: 4D Medicine Limited, Birmingham (GB)

( * ) Notice: Subject to any disclaimer, the term of this patent is extended or adjusted under 35 U.S.C. 154(b) by 398 days.

(21) Appl. No.: 17/611,835

(22) PCT Filed: May 18, 2020

(86) PCT No.: PCT/GB2020/051210
§ 371 (c)(1),
(2) Date: Nov. 16, 2021

(87) PCT Pub. No.: WO2020/234576
PCT Pub. Date: Nov. 26, 2020

(65) Prior Publication Data
US 2022/0219387 A1    Jul. 14, 2022

(30) Foreign Application Priority Data

May 17, 2019  (GB) ...................................... 1906987

(51) Int. Cl.
| | |
|---|---|
| *B29C 64/129* | (2017.01) |
| *B33Y 10/00* | (2015.01) |
| *C08F 2/50* | (2006.01) |
| *B29K 67/00* | (2006.01) |
| *B29K 69/00* | (2006.01) |
| *B29K 75/00* | (2006.01) |

(52) U.S. Cl.
CPC ............ *B29C 64/129* (2017.08); *B33Y 10/00* (2014.12); *C08F 2/50* (2013.01); *B29K 2067/00* (2013.01); *B29K 2069/00* (2013.01); *B29K 2075/00* (2013.01)

(58) Field of Classification Search
None
See application file for complete search history.

(56) References Cited

U.S. PATENT DOCUMENTS

| | | | |
|---|---|---|---|
| 6,207,726 | B1 | 3/2001 | Ohtani et al. |
| 7,354,643 | B2 | 4/2008 | Ito et al. |
| 2003/0198824 | A1 | 10/2003 | Fong et al. |
| 2014/0171539 | A1* | 6/2014 | Chang ................... C07F 7/0838 522/172 X |
| 2015/0116415 | A1 | 4/2015 | Chretien et al. |
| 2016/0362588 | A1 | 12/2016 | Moon et al. |

FOREIGN PATENT DOCUMENTS

| | | |
|---|---|---|
| CN | 86103263 | 11/1986 |
| CN | 106947034 | 7/2017 |
| CN | 107077064 | 8/2017 |
| CN | 107501442 | 12/2017 |
| EP | 0 202 803 | 11/1986 |
| EP | 1 445 035 | 8/2004 |
| JP | 2005-023126 | 1/2005 |
| JP | 2017-165804 | 9/2017 |

OTHER PUBLICATIONS

Feb. 21, 2023 Office Action issued in Chinese Patent Application No. 202080036767.3 (pp. 1-7).
Search Report for GB Application No. 1906987.1 dated Dec. 2, 2019, 4 pages.
International Search Report for PCT/GB2020/051210 dated Jul. 8, 2020, 5 pages.
Written Opinion of the ISA for PCT/GB2020/051210 dated Jul. 8, 2020, 6 pages.
Vincent S.D. Voet et al., "Biobased Acrylate Photocurable Resin Formulation for Stereolithography 3D Printing," ACS Omega 2018, Feb. 2, 2018, pp. 1403-1408.
Neil D. Dolinski et al., "Solution Mask Liquid Lithography (SMaLL) for One-Step, Multimaterial 3D Printing," Advanced Materials 2018, Jun. 21, 2018, 6 pages.
Ran Yu et al., "Three-Dimensional Printing of Shape Memory Composites with Epoxy-Acrylate Hybrid Photopolymer," ACS Applied Materials & Interfaces 2017, Dec. 23, 2016, pp. 1820-1829.
Kristin N. Bauer et al., "Polymerizing Phostones: A Fast Way to In-Chain Poly (phosphonate)s with Adjustable Hydrophilicity," Macromolecules 2018, Feb. 6, 2018, 51, 1272-1279.

\* cited by examiner

*Primary Examiner* — Sanza L. McClendon
(74) *Attorney, Agent, or Firm* — Nixon & Vanderhye PC (57) ABSTRACT

A photocurable resin composition, the photocurable resin composition comprises a prepolymer, a first photoinitiator, and a second distinct photoinitiator, the prepolymer comprising a repeating unit, the repeating unit comprising a first functional group and a distinct second functional group, the first photoinitiator having a first absorption wavelength, and the second distinct photoinitiator having a second absorption wavelength, the first photoinitiator having a first absorption wavelength to functionalise the first functional group, and the second distinct photoinitiator having a second absorption wavelength to functionalise the second functional group.

20 Claims, 8 Drawing Sheets

TUNABLE MATERIALS

This application is the U.S. national phase of International Application No. PCT/GB2020/051210 filed May 18, 2020 which designated the U.S. and claims priority to GB Patent Application No. 1906987.1 filed May 17, 2019, the entire contents of each of which are hereby incorporated by reference.

This invention relates generally to materials with tunable properties. More specifically, although not exclusively, this invention relates to resin compositions for use in the fabrication of materials with tunable mechanical and/or chemical properties, and methods of fabricating the same.

The use of polymer compositions in additive manufacturing, e.g. 3D printing, represents an advantageous technique for the fabrication of bespoke 3D objects. Stereolithography is a type of 3D printing in which objects designed on specialised software may be formed in a layer-by-layer fashion from a photocurable resin composition using photo-polymerisation. Irradiation of the photocurable resin composition at a specific wavelength of light, e.g. UV light, initiates certain functional groups within the molecules of the photocurable resin composition to crosslink to form a polymer network. Some of the most common photocurable resin compositions for use in stereolithography include those that comprise either cross-linkable epoxide functional groups, or cross-linkable acrylate functional groups.

Stereolithography may be used to rapidly manufacture prototypes for a wide range of applications. In particular, there is increasing interest in the use of stereolithography to fabricate objects of a complex shape for use in healthcare applications, for example, medical devices and/or implants. It is desirable for such medical devices and/or implants to exhibit specific mechanical behaviours, depending on the application, such that they may perform their function. For example, an implant for use as a bone replacement will require a different degree of rigidity to that of an implant for use in soft tissue, which will need to be relatively more flexible. Additionally or alternatively, other material properties may be desired, e.g. hydrophobicity, thermal resistance, shape memory, and so on. Therefore, it is advantageous that the photocurable resin composition may be selected to impart the desired material property to the 3D object fabricated in a stereolithographic process.

Voet et. al. (ACS Omega, 2018, 3 (2), pp 1403-1408) describes a homogenous acrylate photoresin for use in stereographic 3D printing to form complex shaped prototypes. The mechanical performance of the prototype was tested and was found to be dependent on the concentration of double bonds in the acrylate photoresin. Therefore, the mechanical performance of the prototypes was tunable by selecting the concentration of double bonds in the photoresin.

Yu et. at. (ACS Appl. Mater. Interfaces 2017, 9, 1820-1829) describes a photocurable resin composition comprising preformed particles composed of polyacrylate-co-epoxy particles, dispersed in an epoxy resin, for the fabrication of objects with shape memory properties. The test samples were fabricated using stereolithography; both the acrylate and epoxy functional groups were crosslinked under laser irradiation with a wavelength of 355 nm.

These prior art approaches show that it is possible to tune the bulk properties, e.g. the mechanical performance, or the shape memory properties, of a 3D object by selecting the appropriate photocurable resin composition.

Although these prior art approaches are useful for some applications, these are limited in that the cured homogenous polymer of the 3D printed object imparts substantially homogenous mechanical behaviour, that is, the same behaviour throughout the entire 3D printed object. Moreover, a further limitation is that any subsequent functionalisation of the polymer (once cured to form the 3D printed object) is limited to the residual functionality used to crosslink the photocurable resin composition to produce the bulk polymer matrix.

It is of increasing interest for 3D objects, e.g. for use as medical implants or devices, to exhibit different material properties in different regions of the 3D object. The use of multi-material systems has been proposed to achieve this aim. For example, U.S. Pat. No. 7,354,643 B2 describes a multi-material photocurable resin compositions for use in the fabrication of 3D objects by stereolithography. The photocurable resin composition forms a microstructure comprising polymeric 'island' particles of polyalkylene ether having a diameter of between 20 to 20,000 nm, which are dispersed in a 'sea' of cured resin that is chemically different to the island particles. The 3D object is fabricated from multiple cured resin layers, each of which may have an uneven dispersion of the polymeric 'island' particles, such that a relatively lower concentration of polymeric 'island' particles in the cured resin 'sea' imparts a higher mechanical strength to this specific portion, and a relatively higher concentration of polymeric 'island' particles in the cured resin 'sea' imparts a higher impact resistance to this specific portion.

However, it is known that multi-material systems of this kind often require the use of complex equipment to achieve the desired microstructure within the 3D object. An additional challenge is that the interface between the different materials within the 3D object is weaker due to the different mechanical properties of each material, and as such, may result in part cracking or failure.

It is desirable to be able to selectively chemically or mechanically modify domains of a 3D printed object by selectively crosslinking the polymer network. Hawker et. al. (Adv. Mater. 2018, 30, 1800364) discloses the use of photochromic dyes in photocurable resin compositions for the fabrication of 3D objects with chemically and mechanically distinct domains. The photocurable resin compositions contain monomers each comprising one type of functional group (either an epoxide or acrylate), a photosensitiser, and a photochromic dye. In use, the photochromic dye absorbs light to inhibit activation of the photosensitiser. However, upon exposure to a specific wavelength of light, the photochromic dye switches to its colourless (non-absorbing) isomer such that light energy is able to reach the photosensitiser to initiate the crosslinking reaction of the resin composition. The use of a multi-material system is disclosed, which comprises an epoxide monomer, an acrylate monomer, and two different photochromic dyes. Irradiation at 470 nm with a small quantity of dual-functional epoxide acrylate monomer led to a cured material comprising dual cationic/radical crosslinking of both of the monomers, which was stiff and glassy. In contrast, irradiation at 530 nm led to a cured material comprising radical initiated crosslinking of the acrylate monomer only, which was soft and rubbery. Therefore, it was found that the mechanical properties of the cured material were controllable by using different wavelengths of light.

One drawback of this approach is that there is no residual functionality within the bulk matrix of the 3D printed object. The resin composition comprises monomers, and as such, the unreacted epoxide monomer of the composition cured at 530 nm is not part of the bulk-polymer matrix. Therefore, this is either washed or diffuses away after the 3D object has been cured, and as such, is unavailable for further functionalisation. Furthermore, the composition requires the use of 'masking' photochromic dyes, which serve no further use in the resulting 3D object.

It is desirable to be able to further modify or functionalise the resulting 3D printed object, post-curing and/or cross-linking to form the 3D printed object. For example, it would be advantageous if the 3D printed object could be further modified or functionalised to change the mechanical properties of the polymer in one or more regions of the 3D printed object. It would also be advantageous to be able to further modify the surface chemistry, for example, to alter the hydrophobicity, the surface chemistry, radio-density, and/or to provide a fluorescent label.

It is therefore a first non-exclusive object of the invention to provide a photocurable resin composition that may be selectively cured to fabricate a 3D object comprising non-homogenous mechanical properties.

It is a further non-exclusive object of the invention to provide a photocurable resin composition that may be selectively cured to fabricate a 3D object, which comprises functionality that is capable of further surface modification and/or post-crosslinking functionalisation.

It is a yet further object of the invention to provide a photocurable resin composition that may be selectively cured to fabricate a 3D object, which has improved interlayer adhesion.

It is a yet further object of the invention to provide a simplified photocurable resin composition that may be selectively cured to fabricate a 3D object, which does not contain unnecessary components, e.g. photocurable masking dyes.

Accordingly, a first aspect of the invention provides a curable, e.g. a photocurable, resin composition, the curable, e.g. photocurable, resin composition comprising a prepolymer, a first initiator, e.g. first photoinitiator, and a second distinct initiator, e.g. second distinct photoinitiator, the prepolymer comprising a repeating unit, the repeating unit comprising a first functional group and a distinct second functional group, wherein the first initiator and distinct second initiator are actuated under distinct conditions. The distinct conditions may comprise heat condition, chemical environment and, preferably, irradiation condition, e.g. the wavelength of irradiating light.

Where present, the first photoinitiator preferably has a first absorption wavelength, and the second distinct photoinitiator may have a second absorption wavelength, the first and second absorption wavelengths being distinct. The first absorption wavelength may be a maximum or peak absorption wavelength. The second absorption wavelength may be a maximum or peak absorption wavelength. The absorption spectrum of the first photoinitiator and the absorption spectrum of the distinct second photoinitiator may have substantially non-overlapping (non-identical/non coincidental) absorption spectra, such that each of the first and second photoinitiator is activatable upon exposure to different wavelengths of incidental electromagnetic radiation.

In use, the first functional groups react, for example react to selectively crosslink the prepolymer, by initiation of the first initiator, say the first photoinitiator using a first wavelength of light. In embodiments, the second distinct functional groups react, for example react to selectively crosslink the prepolymer, by initiation of the second distinct initiator, say the distinct second photoinitiator using a second wavelength of light, the first and second wavelengths of light being different. One type of functional group (e.g. the first functional group) may be crosslinked first to form the bulk matrix of the 3D printed object, and the other type of functional group (e.g. the second functional group) may be crosslinked and/or reacted with a further substance subsequently in a selective manner at specified regions of the 3D printed object.

It has been surprisingly found that 3D printed objects fabricated from the curable, e.g. photocurable, resin composition of the invention exhibit different mechanical properties depending on whether one or both functional groups are crosslinked. Therefore, it has been found that the curable, e.g. photocurable, resin composition may be used to fabricate a 3D printed object with different mechanical properties in different regions of the object. For example, the second functional group need only be crosslinked in a chosen region of the 3D printed object such that this chosen region exhibits a different mechanical property to the remainder of the 3D printed object.

Advantageously, the use of light, one or more photoinitiators and a photocurable resin allows for pixel size resolution within the cured resin. This allows for close and accurate control of cured resin properties. The manipulation of light using well known optical methods allows for curing to take place in desired/required portions of the composition. If two photoinitiators are used the potential for control over properties is multiplied.

Advantageously, the 3D printed objects fabricated by crosslinking only one type of functional groups (e.g. the first functional groups) of the resin, e.g. photocurable resin composition of the invention comprise unreacted functionality (e.g. the second functional groups), which may be used post-curing to further functionalise the 3D printed object, e.g. to further functionalise the surface chemistry and/or to add a label or a tag to the 3D printed object.

By prepolymer, we mean an oligomer of monomer units, which is cross-linkable to form a crosslinked polymer. Preferably, when present in the resin composition, the prepolymer does not contain any cross-linkages within an individual chain or between prepolymer chains, until the resin composition undergoes curing, e.g. photocuring. For example, the prepolymer may be an oligomer composed of a linear chain of monomers. Alternatively, the prepolymer may be an oligomer composed of a branched chain of monomers. The prepolymer for use in the resin, e.g. photocurable, resin, composition of the invention comprises a repeating unit comprising a first functional group and a distinct second functional group. This is in contrast to hybrid polymers, which consist of two or more distinct polymer chains, each of which comprise a single functional group or each comprise a distinct series of functional groups, which are then subsequently linked together.

In embodiments, the repeating unit of the prepolymer may comprise a distinct $n^{th}$ (e.g. third) functional group. The photocurable resin composition of the invention may further comprise an $n^{th}$ (e.g. a third) initiator, e.g. third photoinitiator, distinct from the first initiator, e.g. first photoinitiator and the second distinct initiator, e.g. second photoinitiator. The $n^{th}$ photoinitiator may comprise an absorption wavelength, which may be a maximum or peak absorption wavelength spectrum which does not overlap that of the first and/or second photoinitiator. Alternatively, the $n^{th}$ photoinitiator may comprise an absorption spectrum that overlaps either fully or partially with either the first photoinitiator or the second photoinitiator.

Advantageously, in these embodiments, the resin, e.g. photocurable resin, composition has the capability to be used to fabricate a 3D printed object exhibiting three or more different types of mechanical and/or chemical behaviour by crosslinking different combinations of the first functional groups, the second functional groups, and/or $n^{th}$ functional groups.

The resin, e.g. photocurable resin, composition may further comprise a diluent, e.g. a non-reactive diluent and/or a reactive diluent. A reactive diluent may comprise functional groups including, for example, thiols, alkynes, azides, and/or cyclic carbonates. The diluent may comprise propylene carbonate. A non-reactive diluent may comprise a non-reactive solvent and/or a solvent-acting molecule. A reactive diluent may comprise one or more of the following: small molecule epoxides, alkenes, thiols, and/or hybrid molecules containing any combination of the aforementioned functional groups.

The resin, e.g. photocurable resin, composition may further comprise a crosslinker, e.g. a thiol crosslinker, for example, for producing thiol-ene bonds. The crosslinker may comprise a multi-armed thiol crosslinker, e.g. pentaerythritol tetrakis(3-mercaptopropionate).

Advantageously, the concentration of the prepolymer, the first photoinitiator, the second photoinitiator, the $n^{th}$ photoinitiator (where present) and/or the diluent may be selected and/or designed for use in the fabrication of a 3D object with specific mechanical and/or chemical properties.

The prepolymer may comprise one or more polycarbonate linkages, e.g. an aliphatic polycabonate. Additionally or alternatively, the prepolymer may comprise any suitable linkage, e.g. one or more of the following: phospho-ester linkages, polyester linkages, polyurethane linkages, amide linkages, urea linkages, sulphide linkages, disulphide linkages, thioester linkages, dithioester linkages, thioether linkages and/or a hydrocarbon backbone.

In the resin composition, e.g. photocurable resin composition, of the invention, the prepolymer comprises a repeating unit, the repeating unit comprising a first functional group and a distinct second functional group.

The first and second functional groups may be chemically distinct, for example the first and second groups may not both be acrylates, or both be methacrylates, or both be either acrylates or methacrylates etc. The first and second functional groups may be functionalisable under different conditions, for example ionically (cationically or anionically) or radically. The first and second photoinitiators may be chemically distinct.

The first functional group may comprise or be a cationically curable group (e.g. an epoxide). In embodiments, first functional group may comprise or be a cationically curable group, the first initiator (e.g. the first photoinitiator) may be a cationic initiator (e.g. a cationic photoinitiator) that is usable to selectively crosslink the first functional group (e.g. by using a first wavelength of light).

The second functional group may comprise or be a radically curable group (e.g. an allyl containing moiety). In embodiments, the second functional group may comprise or be a radically curable group, the second initiator (e.g. the second photoinitiator) may be a radical initiator (e.g. a radical photoinitiator) that is usable to selectively crosslink the second functional group (e.g. by using a second wavelength of light).

In embodiments, the first functional group may comprise or be a cationically curable group and the second functional group may comprise or be a radically curable group.

Alternatively, the first functional group may comprise or be a radically curable group, and/or the second functional group may comprise or be a cationically curable group.

The first functional group may be an epoxide. The first functional group may react with one or more crosslinkers and/or diluents to form a functionalised first functional group.

Alternatively, the first functional group may be one of an alkene or a vinyl group, an alkyne, a cyclic carbonate, a cyclic ester, or a cyclic amide.

The second functional group may be an allyl containing moiety. The second functional group may comprise or be an ethylenically unsaturated group. The second functional group may react with one or more crosslinkers and/or diluents to form a functionalised second functional group. For example, the resin composition, e.g. photocurable resin composition, may comprise a crosslinker comprising two or more thiol moieties, which reacts with the second functional group of the prepolymer to form a thiol-ene functional group.

Alternatively, the second functional group may be one of an alkene or a vinyl group, an alkyne, a cyclic carbonate, a cyclic ester, or a cyclic amide.

The ratio of the two functional groups within the prepolymer may be 1:1. Alternatively, the ratio of the two functional groups may be less than 1:1 or more than 1:1 of the first functional group to the second functional group, e.g. the epoxide functional group to the allyl functional group. Advantageously, the ratios are tunable, i.e. the prepolymer may be designed such that a specific ratio of the first functional group to the second functional group is provided.

The first and/or second and/or $n^{th}$ photoinitiator may be or may comprise one or more of a cationic photoinitiator and/or an ionic photoinitiator. For example, the first photoinitiator may be a cationic photoinitiator, and the second photoinitiator may be a radial photoinitiator.

In embodiments, the first and/or second and/or $n^{th}$ photoinitiator may comprise and/or be one or more of Irgacure® 784 (IUPAC name: Bis(.eta.5-2,4-cylcopentadien-1-yl)-bis (2,6-difluoro-3-(1H-pyrrol-1-yl)-phenyl) titanium), an iodonium salt, a silyl or germane initiator, e.g. tris(trimethylsilyl) germane and/or tris(trimethylsilyl)silane (TTMS). In this case, the absorption spectrum, e.g. the first absorption spectrum, of the photoinitiator, e.g. the first photoinitiator, has an excitation wavelength of 450 nm. In embodiments, the photoinitiator may be used to crosslink, e.g. exclusively crosslink, epoxide functional groups.

In embodiments, the first and/or second and/or $n^{th}$ photoinitiator may comprise and/or be Omnirad® 369 (IUPAC name: 2-Benzyl-2-dimethylamino-1-(4-morpholinophenyl)-butanone-1). In this case, the absorption spectrum, e.g. the second absorption spectrum, of the photoinitiator, e.g. the second photoinitiator, has an excitation wavelength of 365 nm. In embodiments, the photoinitiator may be used to crosslink, e.g. exclusively crosslink, allyl groups, e.g. thiol-ene groups.

In embodiments, the first and/or second and/or $n^{th}$ photoinitiator may be or may comprise Irgacure® 819 (IUPAC name: bis(2,4,6-trimethylbenzoyl)-phenylphosphineoxide), H-Nu 640® (a cyanine borate photoinitiator available from Spectra Group Limited, Inc. 27800 Lemoyne Rd., Suite J Millbury, Ohio 43447) and/or Sylanto 7MP (a proprietary diaryliodonium salt with a hexafluorphosphate anion available from Synthos Specialities, Synthos Spófka Akcyjna, Chemików 1, 32-600 Oświęcim, Poland).

A further aspect of the invention provides a method of fabricating a 3D object from a resin composition comprising a prepolymer, a first initiator, e.g. a first photoinitiator, and a second distinct initiator, e.g. a second distinct photoinitiator, the prepolymer comprising a repeating unit, the repeating unit comprising a first functional group and a distinct second functional group, the first initiator being initiated by exposure to a first condition, and the second distinct initiator being initiated by exposure to a second distinct condition, the method comprising:
  (a) Exposing the first initiator to the first condition, thereby causing the first functional group of the prepolymer to react, e.g. selectively react;
  (b) optionally, exposing the second initiator to the second condition, causing the second functional group of the prepolymer to react, e.g. selectively react.

A more specific further aspect of the invention provides a method of fabricating a 3D object from a photocurable resin composition comprising a prepolymer, a first photoinitiator, and a second distinct photoinitiator, the prepolymer comprising a repeating unit, the repeating unit comprising a first functional group and a distinct second functional group, the first photoinitiator having a first absorption spectrum, and the second distinct photoinitiator having a second non-identical absorption spectrum, the method comprising:
  (a) providing light of a first wavelength within the first absorption spectrum to excite the first photoinitiator, causing the first functional group of the prepolymer to react, e.g. selectively react;
  (b) optionally, providing light of a second wavelength within the second absorption spectrum to excite the second photoinitiator, causing the second functional group of the prepolymer to react, e.g. selectively react.

For the avoidance of doubt, any of the features described herein apply equally to any aspect of the invention.

The method of fabricating a 3D object according to the invention may be performed on a stereolithography apparatus.

However, the use of the photocurable resin composition in the method of the invention is not limited to printing applications. The method of the invention may be performed using any other known techniques to fabricate a 3D object, e.g. extrusion, moulding, and so on.

Advantageously, the method may be performed inside a living system, that is, 3D object may be bio-orthogonally assembled, e.g. inside the human or an animal body, without interfering with the native biochemical reactions and processes.

Preferably step (a) of the method is performed before step (b) of the method.

The first functional group of the prepolymer may react with another first functional group on the same or a different prepolymer chain within the resin composition, e.g. the photocurable resin composition, to selectively crosslink the prepolymer to form the bulk matrix of the 3D object.

The second functional group of the prepolymer may react with another second functional group on a different prepolymer chain within the resin composition to selectively crosslink the prepolymer to form a second matrix within the 3D object. The second matrix of crosslinked second functional groups may be responsible for modifying the mechanical behaviour of a region of the 3D printed object. For example, the second matrix may cause a region of the 3D printed object to exhibit increased or decreased mechanical elasticity, shape memory properties (e.g. an increased or decreased shape memory response), compressibility, rigidity, flexibility, and so on, in comparison with the bulk matrix (fabricated from crosslinking the first functional groups) of the 3D object.

Additionally or alternatively, the second functional group of the prepolymer may react with a different chemical species or reagent than those present in the resin composition, e.g. the photocurable resin composition.

For example, the second functional group may react with a reagent to modify, e.g. increase or decrease, the hydrophobicity of a region of the 3D object. The reagent may comprise or be an alkylated thiol.

Additionally or alternatively, the second functional group may react with a reagent to modify, e.g. increase or decrease, the radio density of a region of the 3D object. The reagent may comprise or may be a halogen, e.g. iodine.

Additionally or alternatively, the second functional group may react, e.g. to form a covalent bond, with a molecular label to tag the 3D object. The molecular label may comprise or may be, for example, a biomolecule, a fluorescent label, a dye, and/or a radioisotopic label.

Additionally or alternatively, the second functional group may react with a reagent to modify, e.g. increase or decrease, the cell adhesion of a region of the 3D object. For example, the second functional group may react to form a polyethylene oxide moiety, e.g. to prevent cellular adhesion.

Advantageously, the method of the invention may be implemented using standard stereolithographic printers. For example, the post-polymerisation/post-curing functionalisation (post-crosslinking of the first functional groups of the 3D object) with may be achieved using a second curing chamber.

A yet further aspect of the invention provides a 3D object fabricated from a photocurable resin composition using the method of the invention, the photocurable resin composition comprising a prepolymer, a first photoinitiator, and a second distinct photoinitiator, the prepolymer comprising a repeating unit, the repeating unit comprising a first functional group and a distinct second functional group, the first photoinitiator having a first absorption spectrum, and the second distinct photoinitiator having a second non-coincident absorption spectrum, the method comprising:
  (a) providing light of a first wavelength within the first absorption spectrum to excite the first photoinitiator, causing the first functional group of the prepolymer to react, e.g. selectively react;
  (b) optionally, providing light of a second wavelength within the second absorption spectrum to excite the second photoinitiator, causing the second functional group of the prepolymer to react, e.g. selectively react.

The 3D object may be biocompatible, i.e. not harmful or toxic to living systems.

The 3D object may be a device, e.g. a medical device and/or a medical implant. The medical device or implant may be patient specific for use in, for example, orthopaedic, orthotic, cardiovascular, ophthalmic and/or orthodontic applications.

The 3D object may be a device for use as a surgical guide, e.g. to improve the precision of surgeries. The 3D printed object may be an anatomical model that allows a surgeon to practice before the actual surgery.

Alternatively, the 3D object may be a part for use in the automotive industry. For example, the 3D object may be a part of automotive vehicle that comprises one or more specific failure sites, for example, one or more crush and/or deformation sites that retain the shape of the remainder of the part.

In addition to the advantages described above, the invention provides the following advantages over the prior art.

Tunability—The resin composition, eg the photocurable resin composition, of the invention may be used to fabricate 3D objects with different mechanical and/or chemical properties in different regions of the 3D object. This is conveniently achieved by initiating a first photoinitiator using a first wavelength of light to cause the first functional groups of the prepolymer to crosslink to form the bulk matrix of the 3D object, and by subsequently initiating a second photoinitiator using a second wavelength of light in a specific region of the 3D object to cause the second functional groups of the prepolymer to crosslink to form a region that exhibits different mechanical properties to the rest of the 3D object. It has been surprisingly found that this can be achieved on a single layer basis (50 microns or less).

Capability for further functionalisation, e.g. surface functionalisation, of the 3D object—The 3D object retains inherent and residual functionality after the bulk polymer matrix has been cured. The second functional groups that are unreacted may be used to further functionalise the surface of the 3D object, e.g. to increase the hydrophobicity, radio density, to label the 3D object, and so on.

No inter-layer weakness—There is no weakness caused by inter-layer adhesion because each printed 'layer' is bonded to its subsequent layer in an identical manner throughout the 3D printed object, that is, the bulk matrix is uniform throughout the 3D object. For example, in embodiments, the 3D object is fabricated by crosslinking epoxide functional groups to form the bulk matrix throughout the 3D object. Therefore, there are no inherent points of weakness, e.g. between layers of the resin composition.

Improved processability—The resin composition of the invention has easy processability, which is suitable for use with, for example stereolithography systems and a wide range of photoinitiators. Moreover, no 'masking agents' or additional components, which do not perform a function in the crosslinked structure of the 3D printed object, are required. The resin composition, e.g. the photocurable resin composition does not require the use of several different monomers, and as such, there is no need for multiple dispensers of single components.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. For the avoidance of doubt, the terms "may", "and/or", "e.g.", "for example" and any similar term as used herein should be interpreted as non-limiting such that any feature so-described need not be present. Indeed, any combination of optional features is expressly envisaged without departing from the scope of the invention, whether or not these are expressly claimed. The applicant reserves the right to change any originally filed claim or file any new claim accordingly, including the right to amend any originally filed claim to depend from and/or incorporate any feature of any other claim although not originally claimed in that manner.

The invention is exemplified with the following non-limiting Examples, which are described with reference to the accompanying drawings in which.

SYNTHESIS OF MONOMERS M1 TO M4

Figure 1:
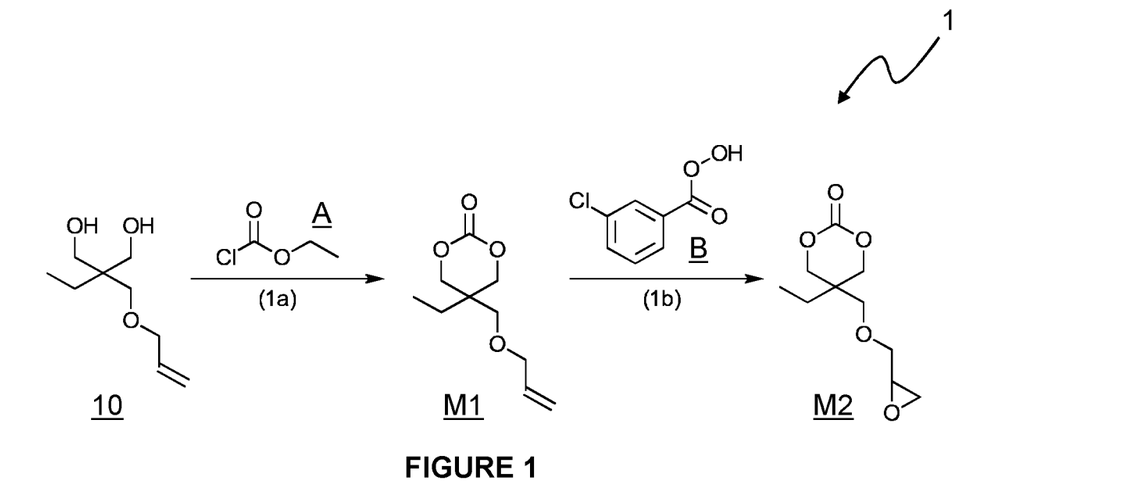
FIG. 1 is a synthetic route to a first and second monomer for use in the preparation of prepolymers, according to embodiments of the invention.
Figure 2:
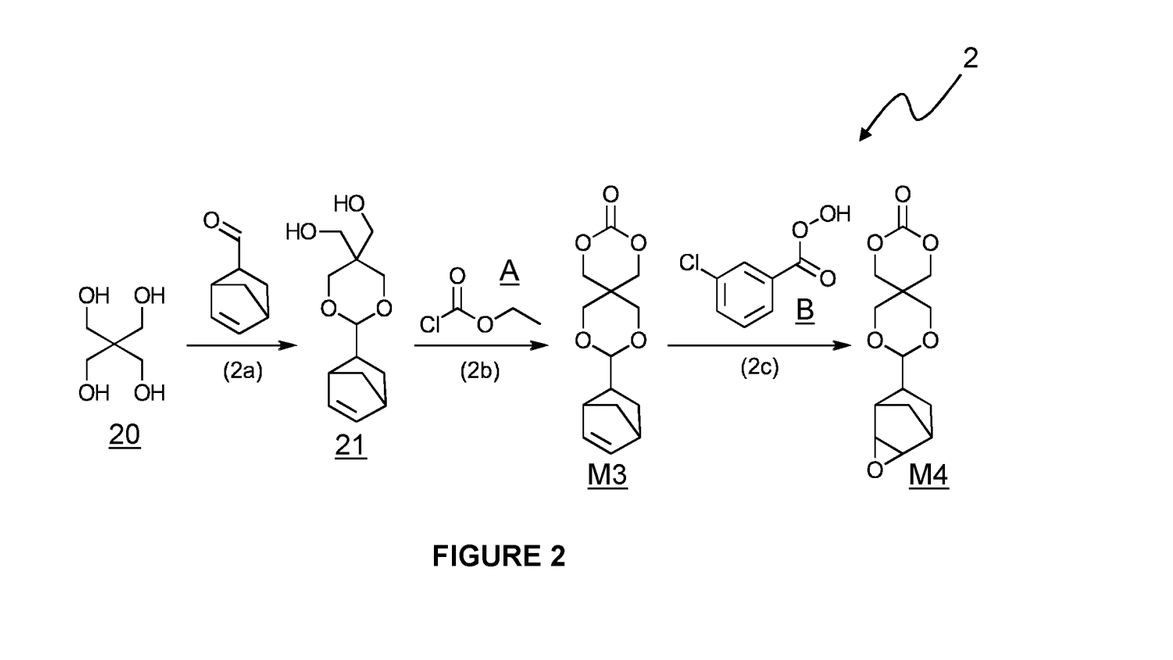
FIG. 2 is a synthetic route to a third and fourth monomer for use in the preparation of prepolymers, according to embodiments of the invention.

Referring now to FIG. 1 and FIG. 2, there is shown the synthetic routes 1, 2 to monomers M1, M2, M3, and M4 for use in fabricating prepolymers, for use in Examples of the photocurable resin compositions of the invention. The monomers M1, M2, M3, and M4, may be used in varying quantities to fabricate prepolymers for use in photocurable resin compositions, according to Examples of the invention.

Procedure 1: Synthesis of Monomer M1

Monomer M1 (5-[(allyloxy)methyl]-5-ethyl-1,3-dioxan-2-one) was synthesised in one step (Step 1a of FIG. 1) from trimethylolpropane allyl ester (shown as 10 in FIG. 1).

Trimethylolpropane allyl ether (shown as 10 in FIG. 1) (112.1 g, 0.64 mol) was dissolved in tetrahydrofuran (THF) (500 mL), followed by the addition of ethyl chloroformate (shown as A in FIG. 1) as a single volume (142.7 g, 1.31 mol). The solution was cooled to 0° C. over 1 hour. Triethylamine (140.1 g, 1.38 mol) was then added dropwise over 2 hours. The solid product was filtered after 24 hours and concentrated down. The product was dissolved in ethyl acetate and washed three times with 1M HCl and once with brine. The isolated product was Monomer M1 (5-[(allyloxy)methyl]-5-ethyl-1,3-dioxan-2-one).

Procedure 2: Synthesis of Monomer M2

Monomer M2 (5-ethyl-5-{[(2-oxiranyl)methoxy]methyl}-1,3-dioxan-2-one) was synthesised in one step (Step 1b of FIG. 1) from Monomer M1 (5-[(allyloxy)methyl]-5-ethyl-1,3-dioxan-2-one).

Monomer M1 (49.97 g, 0.25 mol) was dissolved in dichloromethane (500 mL). meta-Chloroperoxybenzoic acid (shown as B in FIG. 1) (83.92 g, 0.48 mol) was added to the solution. The solution was stirred for 24 hours, followed by cooling in ice for 1 hr. The solution was filtered. Potassium carbonate was added (45 mL), followed by washing with sodium carbonate (10% solution) and concentration via vacuum. The isolated product was Monomer M2 (5-ethyl-5-{[(2-oxiranyl)methoxy]methyl}-1,3-dioxan-2-one).

Procedure 3: Synthesis of Monomer M3

Monomer M3 (9-(5-norbornen-2-yl)-2,4,8,10-tetraoxa-3-spiro[5.5]undecanone) was synthesised in two steps (Steps 2a and 2b) from pentaerythritol (shown as 20 in FIG. 2). The experimental details for Step 2a described below.

In a clean round bottom flask, pentaerythritol (13.5 g, 99.2 mmol) was suspended in 100 mL of deionised water and heated to 80° C. under stirring until all the solid had dissolved. The solution was cooled down to ambient temperature before the addition of conc. HCl (330 µL, 3.26 mmol) with continual stirring for a further 15 min. 5-Norbornene-2-carboxaldehyde (10 g, 89.2 mmol) was added drop-wise to the acidified solution over 20 min. and allowed to stir for a further 2 h. The mono-functionalised product formed an orange precipitate which was collected via vacuum filtration before further purification by silica plug, ethyl acetate as the eluent, and re-crystallisation from hot toluene to yield white crystals of (2-(bicyclo[2.2.1]hept-5-en-2-yl)-1,3-dioxane-5,5-diyl)dimethanol (shown as 21 in FIG. 2).

The experimental details for Step 2b are described below.

[5-(Hydroxymethyl)-2-(5-norbornen-2-yl)-1,3-dioxan-5-yl]methanol (shown as 21 in FIG. 2) (154 g, 0.64 mol) was dissolved in THF (600 mL), followed by the addition of ethyl chloroformate (shown as A in FIG. 2) as a single volume (142.7 g, 1.31 mol). The solution was cooled to 0° C. over 1 hour. Triethylamine (140.1 g, 1.38 mol) was then added dropwise over 2 hours. The solid product was filtered after 24 hours and concentrated down. The product was dissolved in ethyl acetate and washed three times with 1M HCl and once with brine. The isolated product was Monomer M3 (9-(5-norbornen-2-yl)-2,4,8,10-tetraoxa-3-spiro[5.5]undecanone).

Procedure 4: Synthesis of Monomer M4

Monomer M4 (9-(3-oxatricyclo[3.2.1.0$^{2,4}$]oct-6-yl)-2,4,8,10-tetraoxa-3-spiro[5.5]undecanone) was synthesised in one step (Step 2c of FIG. 2) from Monomer M3 (9-(5-norbornen-2-yl)-2,4,8,10-tetraoxa-3-spiro[5.5]undecanone)).

Monomer M3 (66.5 g, 0.25 mol) was dissolved in dichloromethane (600 mL). meta-Chloroperoxybenzoic acid (shown as B in FIG. 2) (83.92 g, 0.48 mol) was added to the solution. The solution was stirred for 24 hours, followed by cooling in ice for 1 hr. The solution was filtered. Potassium carbonate was added (45 mL), followed by washing with sodium carbonate (10% solution) and concentration via vacuum. The isolated product was Monomer M4 (9-(3-oxatricyclo[3.2.1.0$^{2,4}$]oct-6-yl)-2,4,8,10-tetraoxa-3-spiro[5.5]undecanone).

SYNTHESIS OF PREPOLYMER 3A TO 3I

Prepolymers for use in photocurable resin compositions were synthesised using stoichiometric ratios of two or more of monomers M1 to M4 using DBU (1,8-diazabicyclo[5.4.0]undec-7-ene) as the catalyst for polymerisation.

Synthesis of Prepolymer 3A

Figure 3A:
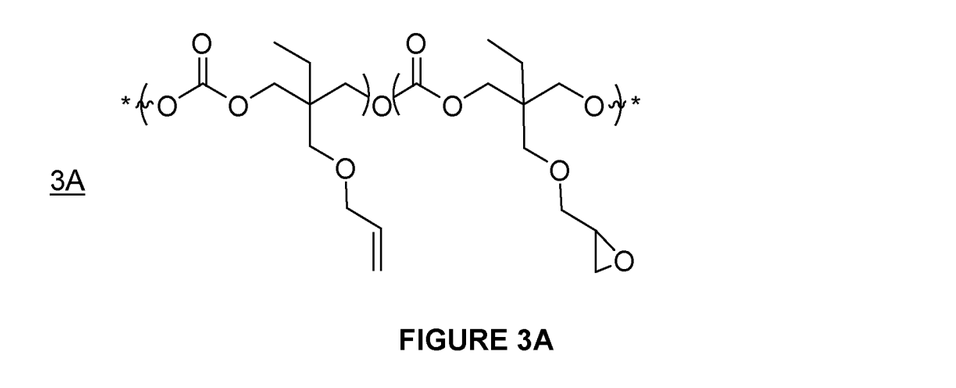
FIGS. 3A to 3I show the chemical structures of prepolymers, according to Examples of the invention.

Referring now to FIG. 3A, there is shown the structures of prepolymer 3A according to embodiments of the invention.

Monomer M1 (10 g, 0.05 mol) and Monomer M2 (10 g, 0.05 mol) were dissolved in dichloromethane (50 mL) under a vacuum that was initially evacuated for 60 seconds. DBU (30 µl) and water (7.5 µl) were added sequentially. The solution was allowed to react for 24 hours. The solution was then concentrated, precipitated in cold hexane, and filtered using ethyl acetate, followed by concentration of the mixture to produce the prepolymer 3A.

The prepolymer 3A comprises an allyl functional group and an epoxide functional group in its repeating unit.

It should be noted that prepolymer 3A may also be fabricated by selectively oxidising some of the double bonds to produce epoxide functional groups, as an alternative to the procedure described above.

Synthesis of Prepolymer 3B

Figure 3B:
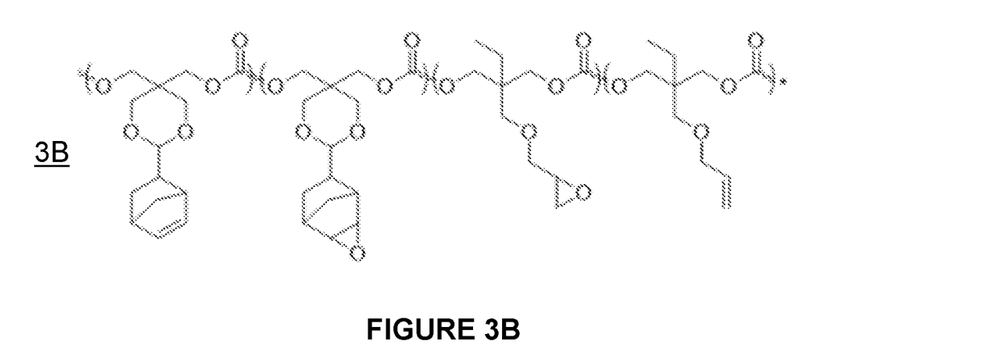

Referring to FIG. 3B, there is shown the structures of prepolymer 3B according to embodiments of the invention.

Monomer M1 (10 g, 0.05 mol), Monomer M2 (10 g, 0.05 mol), Monomer M3 (13.3 g, 0.05 mol), and Monomer M4 (14.1, 0.05 mol) were dissolved in dichloromethane (50 mL) under a vacuum that was initially evacuated for 60 seconds. DBU (30 µl) and water (7.5 µl) were added sequentially. The solution was allowed to react for 24 hours. The solution was then concentrated, precipitated in cold hexane, and filtered using ethyl acetate, followed by concentration of the mixture to produce the prepolymer 3B.

Prepolymer 3B is a poly-(M1-M3-M2-M4) copolymer comprising allyl functionality (originating from monomers M1 and M3) and epoxide functionality (originating from monomers M2 and M4).

Synthesis of Prepolymers 3C to 3I

Figure 3C:
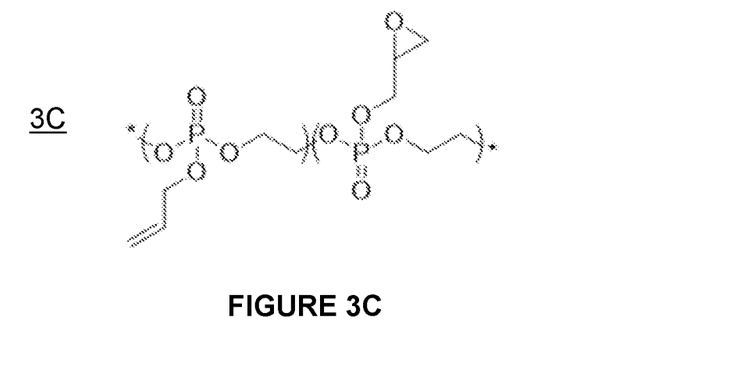
Figure 3D:
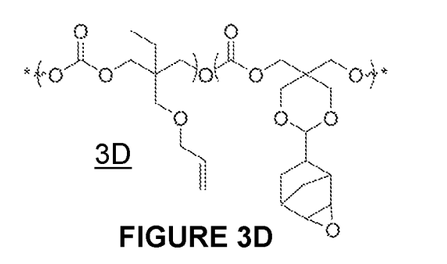
Figure 3E:
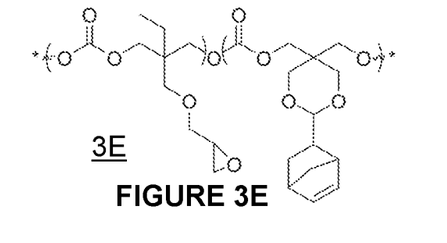
Figures 3F, 3G, 3I:
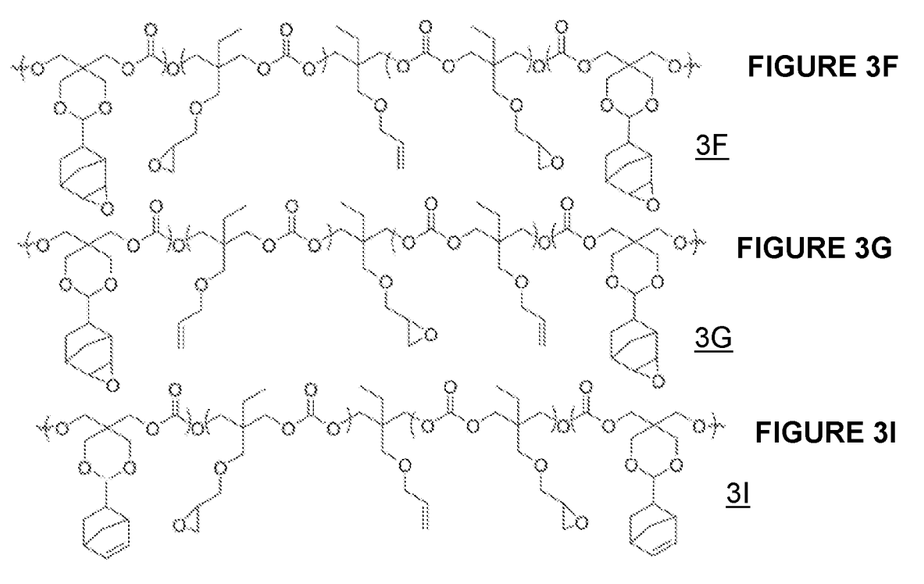
Figure 3H:
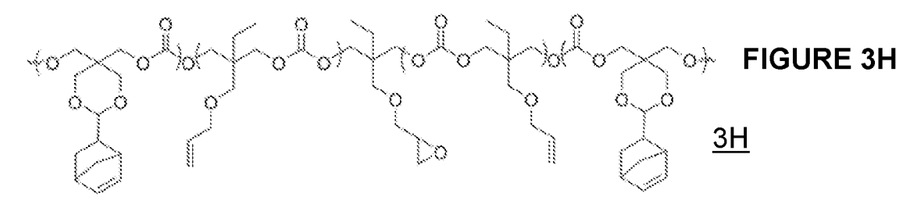

Referring also to FIG. 3C to FIG. 3I, there is shown the structures of further prepolymers 3C to 3I according to Examples of the invention. FIG. 3C shows the prepolymer 3C, which comprises phosphoester linkages.

Synthesis of Prepolymer 3C: The allyl-functionalised and epoxide-functionalised cyclic carbonate monomers required for the synthesis of Prepolymer 3C were made based upon the procedure published in KN Bauer (Macromolecules, 2018, 51, 1272-1279). The monomers were ring-opened using DBU in water in the same manner as described for Prepolymers 3A and 3B.

Synthesis of Prepolymer 3D: Monomer M1 (10 g, 0.05 mol) and Monomer M4 (10 g, 0.05 mol) were dissolved in dichloromethane (50 mL) under a vacuum that was initially evacuated for 60 seconds. DBU (30 µl) and water (7.5 µl) were added sequentially. The solution was allowed to react for 24 hours. The solution was then concentrated, precipitated in cold hexane, and filtered using ethyl acetate, followed by concentration of the mixture to produce the prepolymer 3D.

It should be noted that a random copolymer may be synthesised via ring-opening polymerisation (ROP) of both Monomer M1 and Monomer M4 in a solution of dichloromethane with organobase catalyst, e.g. DBU, in water. In contrast, a statistical block copolymer may be synthesised by initially ring-opening Monomer M1 in the presence of organobase catalyst, e.g. DBU, in water. The resulting precursor (Poly-Monomer M1) may then be isolated, dissolved in dichloromethane, followed by the addition of Monomer M4 to the solution. This protocol may be repeated to obtain further blocks, and/or varied to introduce specific block architecture.

Deblock copolymers may be synthesised by replacement of the water solvent. For example, a deblock copolymer may be synthesised by performing ring-opening polymerisation with an organobase catalyst, e.g. DBU, on Monomer M1 in the presence of a mono-functional alcohol solvent, e.g. methanol, ethanol, isopropyl alcohol, allyl alcohol.

These strategies to obtain different polymer architectures are also applicable to the other monomers disclosed in this application.

Synthesis of Prepolymer 3E: Monomer M2 (10 g, 0.05 mol) and Monomer M3 (10 g, 0.05 mol) were dissolved in dichloromethane (50 mL) under a vacuum that was initially evacuated for 60 seconds. DBU (30 µl) and water (7.5 µl) were added sequentially. The solution was allowed to react for 24 hours. The solution was then concentrated, precipitated in cold hexane, and filtered using ethyl acetate, followed by concentration of the mixture to produce the prepolymer 3E.

Prepolymer 3F and Prepolymer 3G were synthesised using Monomer M1, Monomer M2, and Monomer M4 in a like-manner as described for Prepolymer 3E. The variation in the structure may be achieved by adding the monomers in a different order during ring-opening polymerisation using DBU in water.

Prepolymer 3H and Prepolymer 3I were synthesised using Monomer M1, Monomer M2, and Monomer M3 in a like-manner as described for Prepolymer 3E. The variation in the structure may be achieved by adding the monomers in a different order during ring-opening polymerisation using DBU in water.

EXAMPLES: PHOTOCURABLE RESIN COMPOSITIONS

Example 1

Prepolymer 3B (1 g) was added to a vial along with a four-armed thiol, e.g. pentaerythritol tetrakis(3-mercaptopropionate) (0.67 g). The mixture was allowed to sit for 5 hours, followed by addition of THF and was then heated to 80° C. for 1 hour, after which time, propylene carbonate (1 mL) was added to produce a resin composition.

The following photoinitiators were added to the resin composition in the weight ratio 1:9:26:88 (a:b:c:resin composition).
  a. Irgacure® 784 (IUPAC name: Bis(.eta.5-2,4-cylcopentadien-1-yl)-bis(2,6-difluoro-3-(1H-pyrrol-1-yl)-phenyl) titanium);
  b. Diphenyl iodonium salt;
  c. Tris(trimethylsilyl)silane (TTMS).

Irgacure® 819 (bis(2,4,6-trimethylbenzoyl)-phenylphosphineoxide) was then added to the mixture in 1 wt. % to produce the photocurable resin composition of Example 1.

In this case, the photoinitiators (a+b+c) are considered to be the first photoinitiator.

The photoinitiators (a, b, c) in the photocurable resin composition of Example 1 are suitable for crosslinking epoxide functionality at 450 nm. Irgacure® 819 is suitable for crosslinking thiol-ene functionality at less than 390 nm.

Example 2

Prepolymer 3B (1 g) was added to a vial along with a four-armed thiol, e.g. pentaerythritol tetrakis(3-mercaptopropionate) (0.67 g). The mixture was allowed to sit for 5 hours, followed by addition of THF and was then heated to 80° C. for 1 hour, after which time, propylene carbonate (1 mL) was added to produce a resin composition.

The following photoinitiators were added to the resin composition to produce the photocurable resin composition of Example 2:
  Sylanto 7MP (Synthos Specialities, Synthos Spólka Akcyjna, Chemików 1, 32-600 Oświęcim, Poland) (0.1 wt %);
  Irgacure® 819 (1 wt. %);

The photoinitiator Sylanto 7MP (Synthos Specialities, Synthos Spólka Akcyjna, Chemików 1, 32-600 Oświęcim, Poland) in the photocurable resin composition of Example 2 is suitable for crosslinking epoxide functionality at 360 nm. Irgacure® 819 is suitable for crosslinking thiol-ene functionality at 405 nm.

It should be noted that the photoinitiator H-Nu 640® (Spectra Group Limited, Inc. 27800 Lemoyne Rd., Suite J Millbury, Ohio 43447) in 1 wt. % may be used instead of, or in addition to Irgacure® 819. In this case, the photocurable resin composition may be cured at 600-700 nm to crosslink the thiol-ene functionality.

Advantageously, the crosslinking and the thermomechanical behaviour of the 3D object can be varied and controlled through the introduction and variation of the quantities of different additives.

Figure 4:
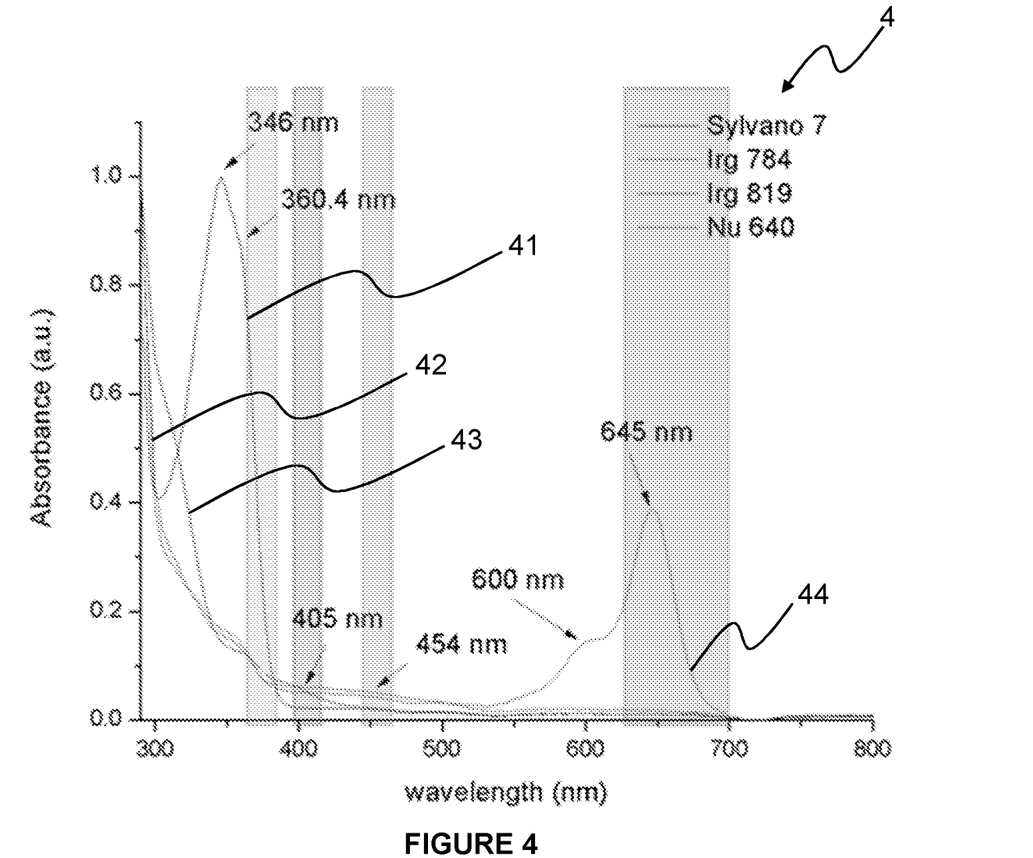
FIG. 4 is a graph showing the absorption spectra of examples of photoinitiators that may be used in the photocurable resin composition of the invention.

Referring now to FIG. 4, there is shown the absorption spectra and associated bands of excitation of four photoinitiators, which may be used in photocurable resin compositions of the invention. There is shown the absorption spectra for Sylanto 7MP (Synthos Specialities, Synthos Spólka Akcyjna, Chemików 1, 32-600 Oświęcim, Poland) (41), Irgacure® 784 (42), Irgacure® 819 (43) and H-Nu 640® (44).

Figure 5:
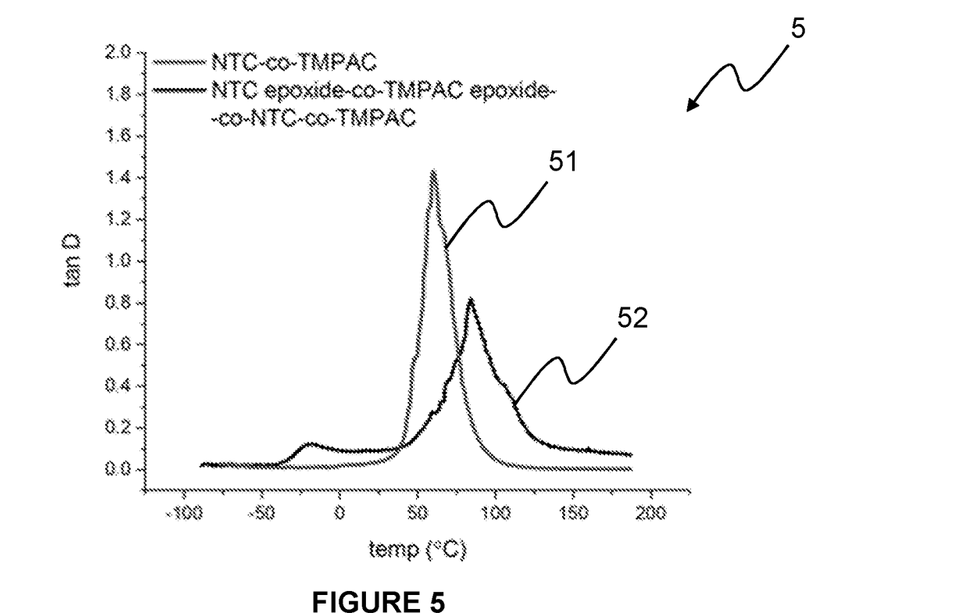
FIG. 5 is a thermomechanical plot for prepolymers for use in Examples of the invention.

Properties of Polymers Fabricated Using the Photocurable Resin Compositions of the Invention Referring now to FIG. 5, there is shown a thermomechanical plot 5 (tan D versus temperature) for a first polymer (51) and a second polymer (52).

The first polymer (51) was fabricated using the protocol described for Example 2, but with substitution of Prepolymer 3B for a prepolymer comprising a copolymer of monomer M1 and monomer M3. The prepolymer used to form the first polymer (51) did not have epoxide functionality.

The second polymer (52) was fabricated using the protocol described for Example 2.

Clearly, for the same constant mechanical force the temperature behaviour of the two polymers differs.

Figure 6:
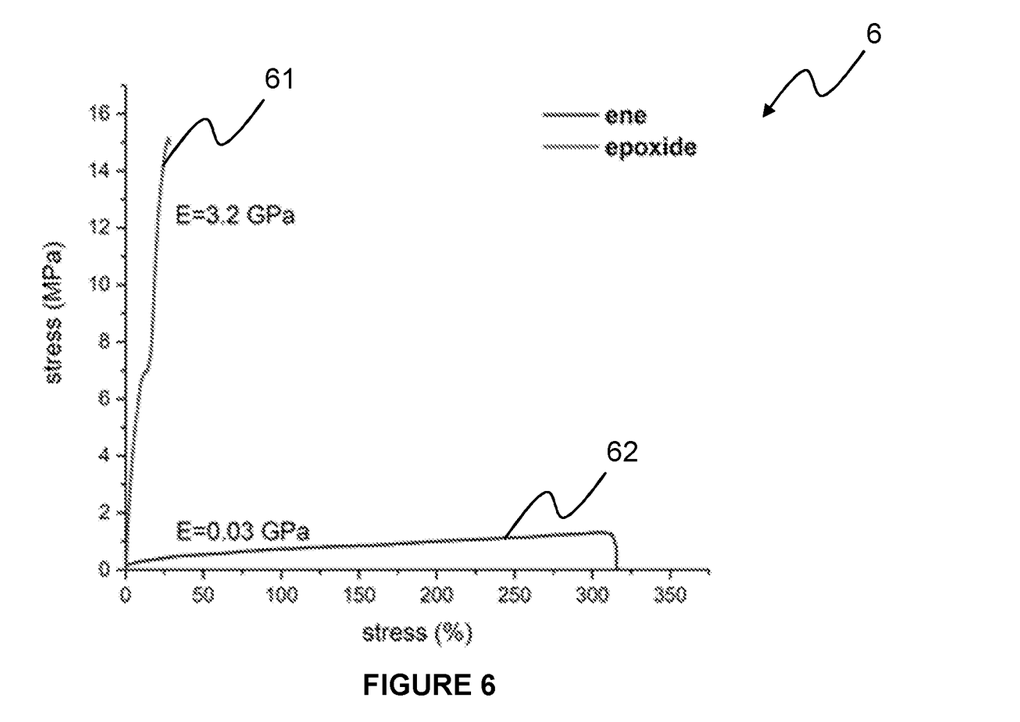
FIG. 6 is a graph comparing the tensile behaviour of Examples and Comparative Examples of the invention.

Referring now to FIG. 6, there is shown a plot 60 comparing the tensile behaviour of a first polymer 61 and a second polymer 62, both fabricated using the prepolymer 3F. The prepolymer 3F of the first polymer 61 was selectively crosslinked at the epoxide moieties, whereas the prepolymer 3F of the second polymer 62 was selectively crosslinked at the allyl moieties.

It is shown that the first polymer 61 displays very hard and brittle behaviour, whereas the second polymer 62 displays very rubbery, elastomeric behaviour.

Advantageously, this illustrates that the tensile behaviour and/or thermomechanical properties of a crosslinked polymer fabricated from a prepolymer comprising two different functionalities may be tuned by selectively crosslinking different functional groups.

The data of FIGS. 5 and 6 demonstrates that by selectively crosslinking the polymer, the bulk or matrix properties can be distinctly varied. Epoxide crosslinking (e.g. shown as 52 in FIG. 5) can produce more rigid, brittle materials with higher glass transition temperatures. In contrast, thiol-ene chemistries (e.g. shown as 51 in FIG. 5) may yield more elastic, flexible polymers with lower glass transition temperatures.

Figure 7A:
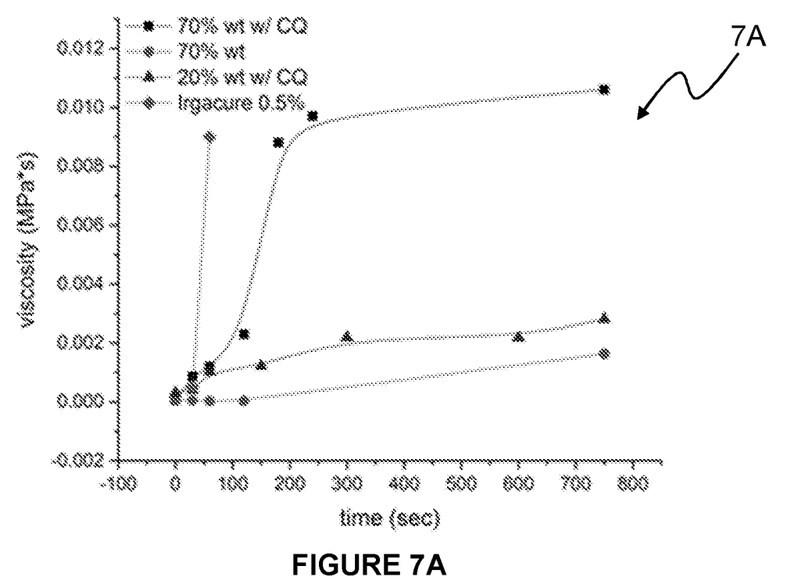
FIGS. 7A and 7B are graphs showing rheological data for photocurable resin compositions using different photoinitiators, according to Examples of the invention.
Figure 7B:
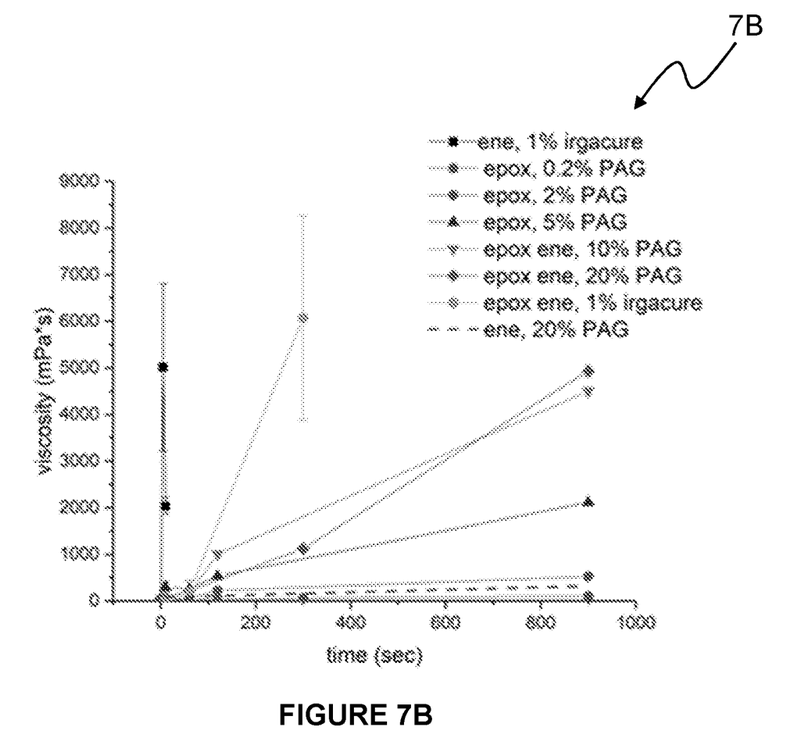

Referring now to FIGS. 7A and 7B, there is shown rheological data for photocurable resin compositions comprising Prepolymer 3A, using different photoinitiators, according to Examples of the invention. Referring to FIG. 7A, there is shown a composition of Prepolymer 3A with different initiators, wherein CQ is camphorquinone, PAG is Omnicure 364® (a cationic initiator), and Irgacure is Irgacure 819®.

Figure 8:
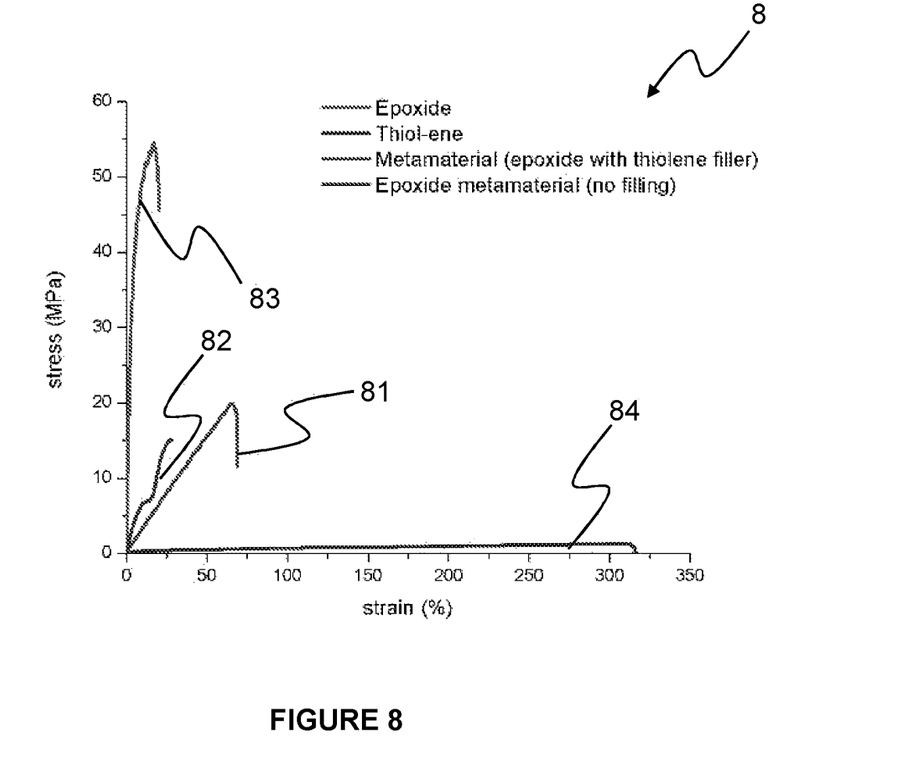
FIG. 8 is a graph showing different mechanical behaviours for different materials fabricated from photocurable resin compositions of Examples and Comparative Examples of the invention.

Referring now to FIG. 8, there is shown a graph 8 showing the different mechanical behaviours for different materials fabricated from photocurable resin compositions. There is shown the stress-strain curve for 3D printed materials comprising solid epoxide matrix with a thiol-ene support matrix material 81, and solid epoxide matrix with no thiol-ene crosslinking material 82, according to Examples of the invention. These materials were fabricated using different wavelengths of light to initiate the required photoinitiators within the photocurable resin composition of Example 1. There is also shown epoxide crosslinking only material 83, thiol-ene crosslinking only material 84, as comparative examples.

It is shown that the epoxide crosslinked material of the comparative examples (material 83) and of the invention (material 82) exhibited more rigid, brittle behaviours. In contrast, the thiol-ene crosslinked material of the comparative example (material 84) exhibited more elastic, flexible properties.

It was surprisingly shown that by combining these two functionalities (epoxide and thiol-ene crosslinking) into one prepolymer in a resin composition to fabricate a material according to embodiments of the invention (material 81), which comprised a solid epoxide matrix with a thiol-ene support matrix material, exhibited a combination of the properties of the epoxide crosslinking and the thiol-ene crosslinking, to provide a material with new, optimised properties.

It has been surprisingly found that selective crosslinking of thiol-ene functionality may be may be performed on the 3D printed object at a depth of 50 μm or less depending on the printer resolution. In this way, the mechanical properties of the 3D printed object can be selectively tuned.

Figure 9:
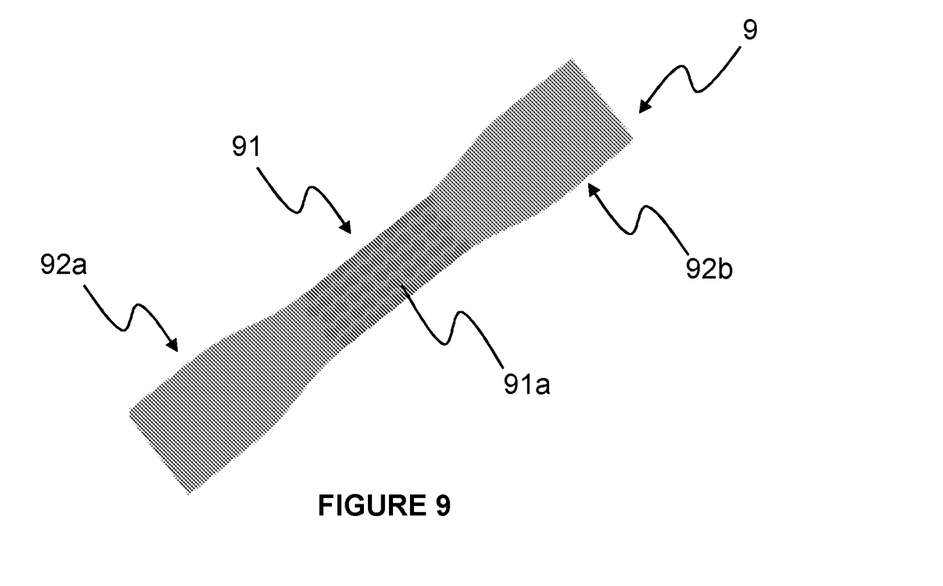
FIG. 9 is a 3D object fabricated from the photocurable resin composition of Example 1 of the invention.
Figure 10A:
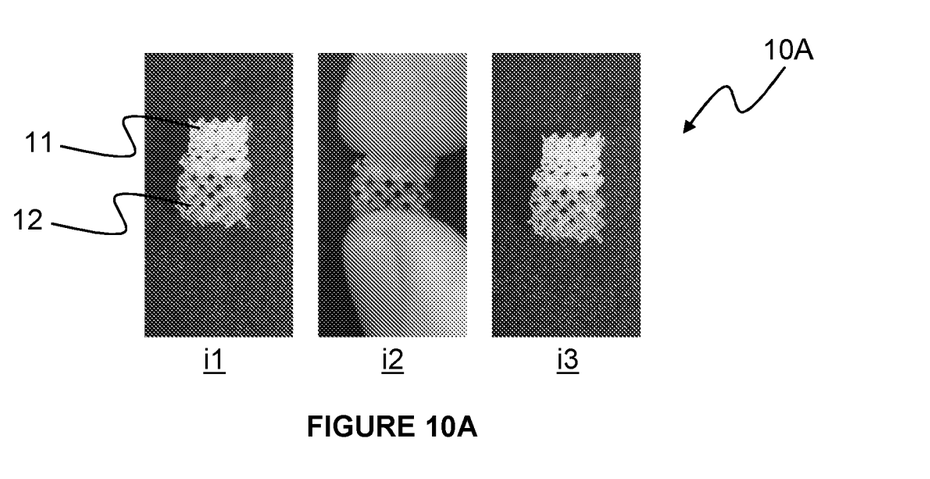
FIG. 10A is a series of images showing a two-part 3D printed object undergoing compression testing.

Referring now to FIG. 9, there is shown a CAD model of a 3D object 9. Referring also to FIG. 10A, there is shown a two-part 3D printed object 10A fabricated using the CAD model of FIG. 9. The two-part 3D printed object 10A was fabricated via stereolithography from the photocurable resin composition of Example 1. The 3D object 9 comprises a central portion 91 and two terminal portions 92a, 92b. The central portion 91 comprises flexible segments 91a. The 3D object 9 was fabricated by printing the photocurable resin composition of Example 1, and by using a 450 nm to initiate the combination of Irgacure® 784, iodonium salt, and tris (trimethylsilyl)silane) photoinitiators to crosslink the epoxide moieties in the photocurable resin to form a solid matrix. The flexible segments 91a were fabricated by printing using a wavelength of less than 390 nm to initiate the Irgacure® 819 to crosslink the thiol-ene moieties in the 3D object 9. Therefore, the flexible segments 91a comprise a solid matrix of epoxide crosslinking and a support matrix of thiol-ene crosslinking.

Surprisingly, the flexible segments 91a (comprising both epoxide and thiol-ene crosslinking) exhibit more flexible mechanical behaviour in comparison to the rest of the 3D object 9 (comprising epoxide crosslinking only).

Referring now to FIG. 10A, there is shown a two-part 3D printed object 10A undergoing compression testing in image i2. The two-part 3D printed object comprises an upper portion 11 and a lower portion 12.

The upper portion 11 comprises a cured resin composition comprising thiol-ene crosslinking only. The lower portion 12 comprises a cured resin composition comprising epoxide crosslinking and a small amount of thiol-ene crosslinking.

Figure 10B:
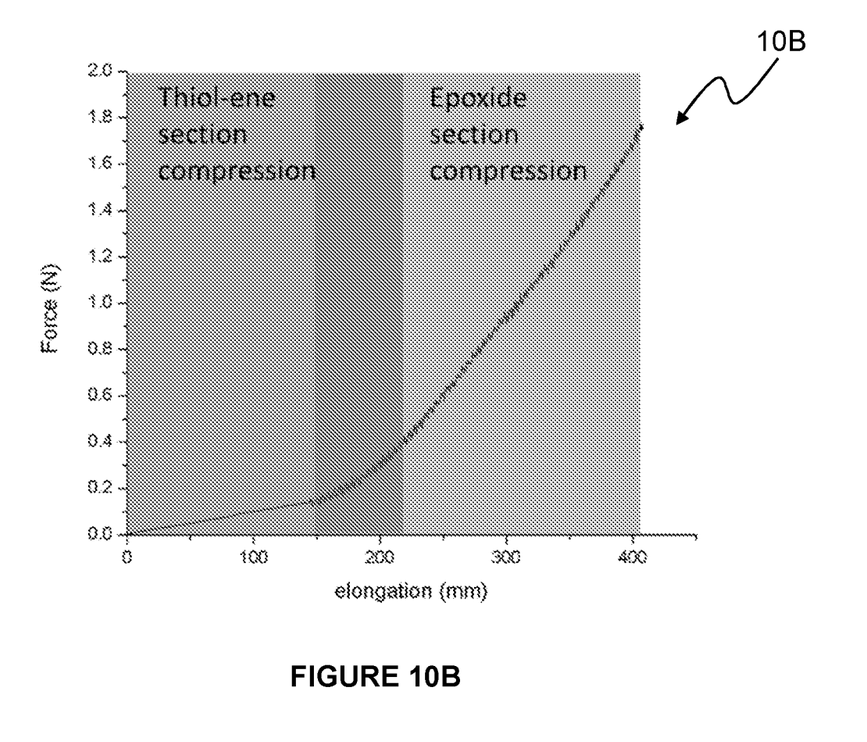
FIG. 10B is a graph measuring the compression of the 3D printed object of FIG. 10A.
Figure 11:
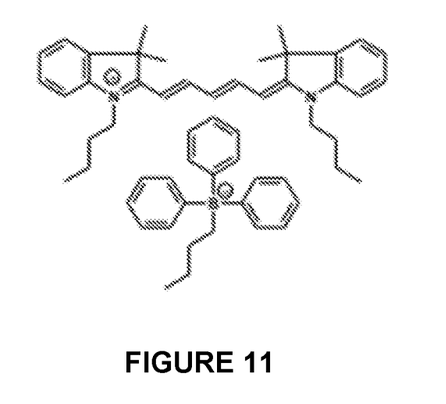
FIG. 11 is a structure for the compound H-Nu 640® (a cyanine borate photoinitiator available from Spectra Group Limited, Inc. 27800 Lemoyne Rd., Suite J Millbury, Ohio 43447.

Referring also to FIG. 10B, there is shown a graph 10B measuring the compression of the 3D printed object 10A.

It is shown that the upper portion 11 (comprising thiol-ene crosslinking) exhibits greater compressibility (see image i2) than the lower portion 12 (comprising epoxide crosslinking only).

Compression of the upper portion 11 is followed by dual compression of both the upper portion 11 and the lower portion 12, where the entire 3D printed object 10A begins to compress uniformly for the remainder of the loading cycle.

Therefore, the photocurable resin compositions of the invention may be used to fabricate 3D objects with different thermo-mechanical properties in different portions or regions of the object.

It will be appreciated by those skilled in the art that several variations to the aforementioned embodiments are envisaged without departing from the scope of the invention. For example, the first and/or second functional groups need not be epoxides and/or allyl groups. The first and/or second functional groups may be any functional group suitable for crosslinking the prepolymer to form a 3D object and/or suitable to further cross-link or functionalise.

It will also be appreciated by those skilled in the art that any number of combinations of the aforementioned features and/or those shown in the appended drawings provide clear advantages over the prior art and are therefore within the scope of the invention described herein.

The invention claimed is:

1. A photocurable resin composition, the photocurable resin composition comprising a prepolymer, a first photoinitiator, and a second distinct photoinitiator, the prepolymer comprising a repeating unit, the repeating unit comprising a first functional group and a distinct second functional group, the first photoinitiator having a first absorption wavelength to functionalise the first functional group, and the second distinct photoinitiator having a second absorption wavelength to functionalise the second functional group, wherein the first photoinitiator and the second photoinitiator are activatable upon exposure to different wavelengths of light.

2. A photocurable resin composition of claim 1, wherein the first photoinitiator is usable to initiate the first functional group to react, by reacting with a further first functional group, and/or the second photoinitiator is usable to initiate the second functional group to react.

3. A photocurable resin composition according to claim 1, wherein the repeating unit comprises a distinct $n^{th}$ functional group.

4. A photocurable resin composition according to claim 3, further comprising an $n^{th}$ photoinitiator, distinct from the first photoinitiator and the second distinct photoinitiator.

5. A photocurable resin composition according to claim 4, wherein the $n^{th}$ photoinitiator is usable to initiate the third functional group to react.

6. A photocurable resin composition according to claim 1, further comprising a diluent, selected from a non-reactive diluent and a reactive diluent.

7. A photocurable resin composition according to claim 1, further comprising a crosslinker.

8. A photocurable resin composition according to claim 1, wherein the prepolymer comprises one or more polycarbonate linkages.

9. A photocurable resin composition according to claim 1, wherein the prepolymer comprises one or more phosphoester linkages, one or more polyester linkages, and/or one or more polyurethane linkages.

10. A photocurable resin composition according to claim 1 wherein the first functional group is an epoxide.

11. A photocurable resin composition according to claim 1, wherein the second functional group is an allyl containing moiety.

12. A photocurable resin composition according to claim 11, further comprising a crosslinker containing two or more thiol moieties.

13. A photocurable resin composition according to claim 1, wherein the ratio of the first functional group to the second functional group within the prepolymer is selected from 1:1, less than 1:1 or more than 1:1.

14. A photocurable resin composition according to claim 1, wherein the first photoinitiator and/or second photoinitiator comprises a cationic photoinitiator and/or wherein the first photoinitiator and/or second photoinitiator comprises an ionic photoinitiator.

15. A photocurable resin composition according to claim 1, wherein the first photoinitiator is selected to be one or more of Irgacure (RTM) 784 (IUPAC name: Bis (eta5-2,4-cylcopentadien-1-yl)-bis(2,6-difluoro-3-(1H-pyrrol-1-yl)-phenyl) titanium), an iodonium salt, and/or tris (trimethylsilyl) silane (TTMS).

16. A photocurable resin composition according to claim 1, wherein the second photoinitiator is selected to be one of Omnirad (RTM) 369 (IUPAC name: 2-Benzyl-2-dimethyl-amino-1-(4-morpholinophenyl)-butanone-1), Irgacure (RTM) 819 (IUPAC name: bis(2,4,6-trimethylbenzoyl)-phenylphosphineoxide), H-Nu 640 (RTM) (Spectra Group Limited and/or Sylanto 7MP (Synthos Specialities.

17. A method of fabricating a 3D object from a photocurable resin composition comprising a prepolymer, a first photoinitiator, and a second distinct photoinitiator, the prepolymer comprising a repeating unit, the repeating unit comprising a first functional group and a distinct second functional group, the first photoinitiator having a first absorption spectrum, and the second distinct photoinitiator having a second absorption spectrum such that the first photoinitiator and the second photoinitiator are activated upon exposure to different wavelengths of light, the method comprising:

(a) providing light of a first wavelength within the first absorption spectrum to excite the first photoinitiator, causing the first functional group of the prepolymer to selectively react;

(b) providing light of a second wavelength within the second absorption spectrum to excite the second photoinitiator, causing the second functional group of the prepolymer to selectively react.

18. A method of fabricating a 3D object according to claim 17, further comprising providing a reagent for reaction of the second functional group in Step (b) to change the hydrophobicity of at least part of the 3D object.

19. A method of fabricating a 3D object according to claim 17, further comprising providing a reagent for reaction of the second functional group in Step (b) to change the radio density of at least part of the 3D object.

20. A method of fabricating a 3D object according to claim 17, further comprising providing a label, preferable selected from a biomolecule, a fluorescent label, a dye, and/or a radioisotopic label, for reaction of the second functional group in Step (b).

* * * * *